United States Patent [19]

Kashiwa et al.

[11] Patent Number: 4,668,753
[45] Date of Patent: May 26, 1987

[54] FILM-FORMING PROPYLENE COPOLYMER, FILM THEREOF AND PROCESS FOR PRODUCTION OF THE FILM

[75] Inventors: Norio Kashiwa, Iwakuni; Mamoru Kioka; Masaki Kohyama, both of Ohtake; Masanobu Ishiyama, Iwakuni, all of Japan

[73] Assignee: Mitsui Petrochemical Industries, Ltd., Tokyo, Japan

[21] Appl. No.: 899,796

[22] Filed: Aug. 25, 1986

Related U.S. Application Data

[63] Continuation of Ser. No. 573,339, Jan. 24, 1984, abandoned.

[30] Foreign Application Priority Data

Jan. 25, 1983 [JP] Japan .................................. 58-9329
Mar. 18, 1983 [JP] Japan .................................. 58-44477

[51] Int. Cl.$^4$ .............................................. C08F 10/06
[52] U.S. Cl. .................................... 526/348; 526/125; 526/128
[58] Field of Search ................................ 526/128, 348

[56] References Cited

U.S. PATENT DOCUMENTS

| | | | |
|---|---|---|---|
| 3,944,530 | 3/1976 | Sugita et al. ...................... | 260/88.25 |
| 4,085,276 | 4/1978 | Toyota et al. ...................... | 526/122 |
| 4,330,649 | 5/1982 | Kioka et al. ........................ | 526/125 |
| 4,336,360 | 6/1982 | Giannini et al. .................... | 526/114 |
| 4,355,144 | 6/1982 | Shiga et al. ........................ | 526/137 |
| 4,552,859 | 11/1985 | Bond et al. .......................... | 502/127 |

FOREIGN PATENT DOCUMENTS 0045977 2/1982 European Pat. Off. .
54-094590 7/1979 Japan .
55-036203 3/1980 Japan .
2040967A 9/1980 United Kingdom .
2054616 2/1981 United Kingdom .
2111066 6/1983 United Kingdom .

OTHER PUBLICATIONS

*Chemical Abstracts,* vol. 82, No. 7366v—Mitsubishi Chemical Industries, Co., Ltd.

*Primary Examiner*—Paul R. Michl
*Assistant Examiner*—Peter D. Mulcahy
*Attorney, Agent, or Firm*—Sherman and Shalloway

[57] ABSTRACT

A film-forming propylene copolymer composed of a major amount of propylene and a minor amount of ethylene, characterized by having (A) an ethylene content (Ec) of from 0.1 mole % to 2.0 mole % based on the total amount of propylene and ethylene, and (B) an isotactic value (Iso) in the range represented by the following formula (1) or (2), (i) when $0.1 \leq Ec \leq 0.3$, $$\text{Iso} \geq -5\underline{Ec} + 96.3 \, (\%) \quad (1),$$

and (ii) when $0.3 < Ec \leq 2.0$, $$\text{Iso} \geq -0.67\underline{Ec} + 95.0 \, (\%) \quad (2)$$

wherein $\underline{Ec}$ represents the numerical value of Ec (mole %);

a film of the copolymer; and a process for producing the film.

10 Claims, No Drawings

FILM-FORMING PROPYLENE COPOLYMER, FILM THEREOF AND PROCESS FOR PRODUCTION OF THE FILM

This application is a continuation of application Ser. No. 573,339, filed Jan. 24, 1984, now abandoned.

This invention relates to a film-forming propylene copolymer composed of a major amount of propylene and a minor amount of ethylene having excellent stretchability, rigidity, transparency, impact strength and heat shrinkage resistance, a film of the copolymer, and a process for producing the film.

More specifically, this invention relates to a film-forming propylene copolymer composed of a major amount of propylene and a minor amount of ethylene, characterized by having (A) an ethylene content (Ec) of from 0.1 mole % to 2.0 mole % based on the total amount of propylene and ethylene, and (B) an isotactic value (Iso) in the range represented by the following formula (1) or (2), (i) when $0.1 \leq Ec \leq 0.3$, $$Iso \geq -5\underline{Ec} + 96.3 (\%) \quad (1),$$

and (ii) when $0.3 < Ec \leq 2.0$, $$Iso \geq -0.67\underline{Ec} + 95.0 (\%) \quad (2)$$

wherein $\underline{Ec}$ represents the numerical value of Ec (mole %).

The invention also relates to a biaxially stretched film of the copolymer, and a process for producing the film.

Polypropylene or propylene copolymers composed of a major amount of propylene and a minor amount of another olefin (to be sometimes referred to generically as polypropylene) have found extensive use in the field of a film in its broad sense, for example as a biaxially stretched polypropylene film (to be sometimes abbreviated hereinafter as an OPP film), a stretched tape, a stretched flat yarn, a stretched split fiber or a stretched band because they have good mechanical strength, rigidity and transparency in the form of their stretched shaped articles. In particular, the OPP film has been widely used as a packaging material by utilizing its excellent transparency, mechanical strength, moisture-proofness and rigidity.

In some applications, it is desired to provide stretched shaped articles, such as a film, of polypropylene which have more improved rigidity.

Generally, the propylene homopolymer has better rigidity than a propylene copolymer composed of a major amount of propylene and a minor amount of ethylene. It is usual therefore to utilize stretched shaped articles of propylene homopolymer where rigidity is especially required.

It is known that the use of propylene homopolymer having an isotactic index (II) of at least 98.0% gives shaped articles having more improved rigidity (see Japanese Laid-Open Patent Publication No. 103,819/1982. However, as the II of propylene homopolymer is increased, its stretchability becomes worse and stretching at a high stretch ratio becomes difficult. Accordingly, even when propylene homopolymer having a high II is used, it is difficult to obtain stretched shaped articles of the propylene homopolymer having sufficiently high rigidity.

It is known on the other hand that in order to improve the stretchability of propylene homopolymer, a random copolymer of propylene with a minor amount of ethylene is used (see Japanese Laid-Open Patent Publication No. 32512/1981) (corresponding to U.S. Pat. No. 4,355,144). This patent document proposes to use polypropylene having an ethylene content of 0.1 to 1.0% by weight which is produced by polymerizing propylene with a minor amount of ethylene using a catalyst composed of an organoaluminum compound and titanium trichloride prepared, for example, by reducing titanium tetrachloride with an organoaluminum compound and activating the reduction product. The random copolymer produced by using such a conventional catalyst has somewhat improved stretchability. However, the II of the copolymer abruptly decreases as a result of copolymerizing even a very small amount of ethylene, and such a copolymer only gives a stretched shaped article having low rigidity and stiffness. Thus, although methods have been proposed for improving the rigidity and stretchability of polypropylene separately, no polypropylene which has both excellent rigidity and stretchability has yet been developed.

Furthermore, attempts have previously been made to improve the impact strength of polypropylene by blending polypropylene with polyethylene or an amorphous or low-crystalline ethylene/propylene random copolymer, or by polymerizing propylene in the presence of a small amount of an alpha-olefin such as ethylene or 1-butene. Such attempts, however, resulted in degraded transparency or rigidity.

It has been desired therefore to provide a film-forming copolymer, either as such or in the form of a stretched film, having in a well balanced condition various properties which have heretofore been unable to stand compatible, without degrading the inherent desirable properties of polypropylene.

The present inventors have made investigations in order to provide a film-forming propylene copolymer or its stretched film which can achieve the above desire. These investigations have led to the discovery that it is possible to impart to polypropylene various properties which have heretofore been unable to stand compatible, for example rigidity, stretchability, transparency, impact strength, and heat shrinkage resistance, in an improved and well balanced condition, and that in order to impart these improved properties in combination, it is necessary to prepare a film-forming propylene copolymer composed of a major amount of propylene and a minor amount of ethylene which has a specified correlation between its ethylene content (Ec) and isotactic value (Iso).

The present inventors' investigations have shown that a film-forming propylene copolymer composed of a major amount of propylene and a minor amount of ethylene which is characterized by having (A) an ethylene content (Ec) of from 0.1 mole % to 2.0 mole % based on the total amount of propylene and ethylene, and (B) an isotactic value (Iso) in the range represented by the following formula (1) or (2), (i) when $0.1 \leq Ec \leq 0.3$, $$Iso \geq -5\underline{Ec} + 96.3 (\%) \quad (1),$$

and (ii) when $0.3 < Ec \leq 2.0$, $$Iso \geq -0.67\underline{Ec} + 95.0 (\%) \quad (2)$$

wherein $\underline{Ec}$ represents the numerical value of Ec (mole %),
and preferably further having (C) an intrinsic viscosity $[\eta]$, determined in decalin at 135° C., of from 1.2 to 6.0 dl/g, achieves the above desire and has not been described in the prior literature.

The investigations of the present inventors also show that the aforesaid polypropylene exhibits a combination of excellent properties in the form of a stretched shaped article, particularly a stretched film article (meant to include films or film-like stretched articles such as films, sheets, tapes, bands, etc.), above all in the form of a biaxially stretched film article.

It is an object of this invention therefore to provide a film-forming propylene copolymer composed of a major amount of propylene and a minor amount of ethylene either as such or in the form of a biaxially stretched film which has improved properties.

Another object of this invention is to provide a process for producing a biaxially stretched film of the above copolymer.

The above and other objects and advantages of this invention will become apparent from the following description.

The propylene copolymer of this invention has an ethylene content (Ec) of from 0.1 to 2.0 mole %, preferably from 0.1 to 1.5 mole %, more preferably from 0.3 to 1.5 mole %, based on the total amount of propylene and ethylene [characteristic (A)].

The ethylene content (Ec) should be within the above-specified range in relation to the isotactic value (Iso) [characteristic (B)] of the copolymer to be described. If the ethylene content (Ec) is lower than the specified limit, it is difficult to provide a propylene copolymer having satisfactory stretchability in combination with other desirable properties. On the other hand, if the ethylene content (Ec) is higher than the specified limit, it is difficult to provide a propylene copolymer having satisfactory rigidity in combination with other desirable properties, and the resulting copolymer gives a shaped article having low stiffness. The heat resistance of the resulting copolymer is also unsatisfactory.

In the present invention, the ethylene content (Ec) of the copolymer is measured and determined by its $C^{13}$-NMR spectrum.

The propylene copolymer of the invention has an isotactic value (Iso) in the range expressed by the following formula (1), preferably (1)', or the following formula (2), preferably (2)' [characteristic (B)].

(i) When $0.1 \geq Ec \geq 0.3$, $$Iso \geq -5\underline{Ec} + 96.3(\%) \quad (1)$$

$$\text{preferably } Iso \geq -5\underline{Ec} + 96.8(\%) \quad (1)'$$

(ii) When $0.3 < Ec \leq 2.0$, $$Iso \geq -0.67\underline{Ec} + 95.0(\%) \quad (2)$$

$$\text{preferably } Iso \geq -0.67\underline{Ec} + 95.5(\%) \quad (2)'$$

In the above formulae, $\underline{Ec}$ represents the numerical value of Ec (mole %).

Shaped articles of the propylene copolymer which do not satisfy the above isotactic values (Iso) do not show satisfactory rigidity in combination with other desirable properties, and have low stiffness.

There is no particular upper limit to the Iso value.

The isotactic value (Iso) of the copolymer, as used herein, is the triadstacticity (%) of the propylene copolymer determined in accordance with $C^{13}$-NMR using the signal of the carbons of the methyl groups of the copolymer. The methyl groups of propylene present adjacent to ethylene are excluded in performing the above determination.

Preferably, the film-forming propylene copolymer of this invention has an intrinsic viscosity $[\eta]$, determined in decalin at 135° C., of from 1.2 to 6.0 dl/g, preferably from 1.5 to 5.0 dl/g [characteristics (C)].

If the intrinsic viscosity is lower than the above limit, the melt viscosity of the copolymer tends to become low and adversely affect its moldability even when the copolymer satisfies the characteristics (A) and (B). If it is higher than the specified limit, the melt viscosity of the copolymer tends to become too high and adversely affect its stretchability and moldability. In a preferred embodiment of this invention, therefore, the copolymer satisfies a combination of the characteristics (A), (B) and (C).

The film-forming propylene copolymer of this invention can be produced by selecting a suitable catalyst and suitable polymerization conditions. For example, in one preferred embodiment, the propylene copolymer can be produced by copolymerizing propylene and a small amount of ethylene under such conditions that if propylene alone is polymerized in the presence of a catalyst formed of (1) a spherical highly active solid titanium catalyst component containing magnesium, titanium, chlorine and an ester of phthalic acid with an alcohol having at least 2 carbon atoms as essential ingredients and having an average particle diameter of about 1 to about 200 microns with the geometric standard deviation of its particle size distribution being not more than 2.1, (2) an organoaluminum catalyst component and (3) an organic silicon compound having an Si-C bond, the resulting homopolymer of propylene has an Iso value of at least 97.0%.

The catalyst ingredient (1) contains amorphous magnesium chloride and preferably has a specific surface area of about 40 to about 800 $m^2/g$, a chlorine/titanium atomic ratio of from about 5 to about 100, a phthalate/titanium mole ratio of from about 0.2 to about 6 and a magnesium/titanium mole ratio of from about 4 to about 50. It may further contain another electron donor, a functional group, a metal, an element, etc. The titanium catalyst component (1) has a particle size of about 1 to about 200 microns, and is in the form of a sphere such as a true sphere, an ellipse or a granule having a geometric standard deviation of its particle size distribution of not more than 2.1, preferably not more than 1.95.

The particle size distribution and the average particle diameter of the particles of the titanium catalyst component (1) can be measured by a light transmission method. Specifically, the catalyst component is diluted in an inert solvent such as decalin to a concentration of about 0.01 to 0.5%, and the diluted component is put in a measuring cell. Fine light rays are applied to the cell, and the intensity of light passing through the liquid in a certain condition of particle precipitation is continuously measured, and the particle size distribution is measured. On the basis of the particle size distribution, the average particle diameter of the catalyst component (1) and the geometric standard deviation $6_g$ can be calculated.

The aforesaid highly active solid titanium catalyst component can be produced, for example, in accordance with the method described in Japanese Patent Application No. 181019/1981 (corresponding to Japanese Laid-Open Patent Publication No. 83006/1983).

Examples of the phthalate ester as an essential ingredient of the titanium catalyst component (1) include esters of phthalic acid with alcohols having 2 20 carbon atoms, such as diethyl phthalate, di-n-propyl phthalate, diisopropyl phthalate, di-n-butyl phthalate, diisobutyl phthalate, di-n-hexyl phthalate, n-octyl phthalate, 2-ethylhexyl phthalate and ethyl-n-octyl phthalate.

Examples of the organoaluminum catalyst component (2) are tri ($C_1$–$C_{16}$ alkyl) aluminums such as triethyl aluminum, triisopropyl aluminum, triisobutyl aluminum, tri-n-hexyl aluminum, tri-n-hexyl aluminum, and tri-n-butyl aluminum, ($C_1$–$C_{16}$ alkyl)aluminum halides such as diethyl aluminum chloride, dibutyl aluminum chloride, ethyl aluminum sesquichloride, butyl aluminum sesquichloride and ethyl aluminum dichloride, and mixtures of these with trialkyl aluminums.

Examples of the organic silicon compound (3) include methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, diphenyldiethoxysilane and methylphenyldimethoxysilane.

In the production of the film-forming propylene copolymer of this invention, the polymerization can be carried out either in the liquid or vapor phase. In the liquid phase polymerization, an inert solvent such as hexane, heptane or kerosene may be used as a reaction medium. Propylene itself may also be used as the reaction medium.

The amount of the catalyst used may be properly chosen. For example, per liter of the reaction volume, the ingredient (1) is used in an amount of about 0.0001 to about 1.0 millimoles calculated as titanium atom; the ingredient (2) is used in an amount of about 1 to about 2000 moles, preferably about 5 to about 500 moles, as metal atoms, per mole of the titanium atoms in the ingredient (1); and the ingredient (3) is used in an amount of about 0.001 to about 10 moles, preferably about 0.01 to about 2 moles, especially preferably about 0.04 to about 1 mole, as Si atoms in the ingredient (3), per mole of the metal atoms (Al) in the ingredient (2).

These catalyst ingredients (1), (2) and (3) may be contacted during or before the polymerization. Before the polymerization, any two of these catalyst ingredients may be contacted, or portions taken from two or three of these catalyst ingredients may be contacted with each other. Furthermore, the contacting of the catalyst ingredients before the polymerization may be carried out in an atmosphere of an inert gas or in an atmposhere of an olefin such as propylene.

The polymerization temperature may be properly chosen. For example, it is about 20° to about 100° C., more preferably about 50° to about 80° C. The polymerization pressure may, for example, be normal atmospheric pressure to about 50 kg/cm$^2$, preferably about 2 to about 50 kg/cm$^2$.

Preferably, the polymerization is carried out continuously. The intrinsic viscosity of the polymer can be advantageously adjusted by using hydrogen.

It is possible to incorporate into the polypropylene of this invention various additives normally used in polyolefins, for example heat stabilizers, weather stabilizers, lubricants, slip agents, antiblocking agents, antistatic agents, antihaze agents, pigments, dyes, inorganic or organic fillers, hydrochloric acid absorbers, nucleating agent, etc. in amounts which do not impair the objects of this invention.

Examples of the heat stabilizers are those of the phenol, sulfur, amine and phosphorus types including
p-hydroxyanisole,
3-methyl-4-isopropyl phenol,
ascorbic acid,
2-tert-butyl-4,6-dimethyl phenol,
2-tert-butyl-4-methoxy phenol,
2,6-di-tert-butyl phenol,
propyl gallate,
styrenated mixed cresol,
2-(1-methyl cyclohexyl)-4,6-dimethyl phenol,
2,4-di-tert-butyl-5-methyl phenol,
3,5-di-tert-butyl-4-hydroxy toluene,
2,5-di-tert-butyl-4-hydroxy phenol,
4-hydroxymethyl-2,6-di-tert-butyl phenol,
2,4,6-tri-tert-butyl phenol,
2,6-di-tert-butyl-α-dimethylamino-p-cresol,
1,1-bis-(4-hydroxy phenyl)cyclohexane,
octyl gallate,
nordihydroguaiaretic acid,
dodecyl gallate,
butylated bisphenol A,
4,4'-methylene-bis(2-tert-butyl-6-methyl phenol),
2,2'-methylene-bis(4-methyl-6-tert-butyl phenol),
4,4'-thio-bis(2-methyl-6-tert-butyl phenol),
4,4'-thio-bis(3-methyl-6-tert-butyl phenol),
2,2'-thio-bis(4-methyl-6-tert-butyl phenol),
2,2'-methylene-bis(4-ethyl-6-tert-butyl phenol),
N-stearoyl-p-aminophenol,
4,4'-butylidene-bis(6-tert-butyl-m-cresol),
bis(3-methyl-4-hydroxy-5-tert-butylbenzyl)sulfide,
2,2'-methylene-bis(4-methyl-6-cyclohexyl phenol),
4,4'-methylene-bis(2,6-di-tert-butyl phenol),
d,1-α-tocopherol,
2,2'-methylene-bis(6-α-methylbenzyl-p-cresol),
2,6-bis(2'-hydroxy-3'-tert-butyl-5'-methylbenzyl)-4-methyl phenol,
n-octadecyl-3-(4'-hydroxy-3',5'-di-tert-butyl phenyl)-propionate,
1,1,3-tris(2-methyl-4-hydroxy-5-tert-butyl phenyl)butane,
4,4'-butylidene-bis(3-methyl-tert-butyl phenol),
2-lauryl triacetin,
6-(4-hydroxy-3,5-di-tert-butylanilino)-2,4-bis(octylthio)-1,3,5-triazine,
2,4-bis(4-hydroxy-3,5-di-tert-butylanilino)-6-(n-octylthio)-1,3,5-triazine,
1,3,5-tris(4-tert-butyl-3-hydroxy-2,6-dimethyl benzyl)-S-triasine-2,4,6-(1H.3H.5H)-trione,
tris(3,5-di-tert-butyl-4-hydroxy)phosphate,
1,3,5-trimethyl-2,4,6-tris(3,5-di-tert-butyl-4-hydroxyphenyl)benzyl benzene,
1,3,5-tris(3',5'-di-tert-butyl-4'-hydroxy benzyl)-S-triazine-2,4,6-(1H.3H.5H)-trione,
di-stearyl(4-hydroxy-3-methyl-5-tert-butyl phenyl)malonate,
ethyleneglycol-bis[3,3-bis(3'-tert-butyl-4'-hydroxyphenyl)butyrate,
tris[2-tert-butyl-4-thio(2'-methyl-4'-hydroxy-5'-tert-butyl phenyl)-5-methtyl phenyl]phosphite, tetrakis[methtylene-3(3,5-di-tert-butyl-4-hydroxyphenyl)propionate]methane,
phenol condensation products,
hindered phenol derivative,
phenol condensation products,
3,5-di-tert-butyl-4-hydroxy benzyl phospholic-acid distearyl ester,
2-mercaptobenzimidazole,
phenothiazine,
N,N'-diphenyltiourea.
tetramethylthiuram disulfide,
N-oxydiethylene-2-benzothiazolylsulfenamide,
N-cyclohexyl-2-benzothiazolylsulfenamide,
cyclohexylamine salt of 2-mercaptobenzothiazole,
N,N-diisoproyl-2-benzothiazolylsulfenamide,
2-(N,N-diethylthiocarbamoylthio)benzothiazole,
tetraethylthiuram disulfide,
dibenzothiazyl disulfide,
zinc diethyl dithiocarbamate,
zinc ethyl phenyl dithiocarbamate,
zinc di-n-butyl dithiocarbamate,
dilauryl thiodipropionate,
dilauryl thiodi-1,1'-methylbutyrate,
dimyristyl-3,3'-thiodipropionate,
lauryl stearyl thiodipropionate,
distearyl thiodipropionate,
distearyl thiodibutyrate,
penta(erythrytyl-tetra-$\beta$-mercapto lauryl)propionate,
phenyl-$\alpha$-naphthylamine,
phenyl-$\beta$-naphthylamine,
oxanilide,
hydrazine derivative,
triphenyl phosphite,
2-ethylhexyl acid phosphate,
dilauryl phosphite,
tri-iso-octyl phosphite,
tris(2,4-di-tert-butyl phenyl)phosphite,
trilauryl phosphite,
trilauryl-di-thiophosphite,
trilauryl tri-thiophosphite,
trinonyl phenyl phosphite,
distearyl pentaerythritol diphosphite,
tris(mixed mono dinonyl phenyl)phosphite,
trioctadecyl phosphite,
4,4-butylidene-bis(3-methyl-6-butyl)tridecyl phosphite, and
4,4'-butylidene-bis(3-methyl-6-tert-butylphenyl-ditridecyl)phosphite, Examples of the weatherability stabilizers include
2,4-dihydroxybenzophenone,
2-hydroxy-5-chlorobenzophenone,
2-(2'-hydroxy-5'-methyl phenyl)benzotriazole,
2-hydroxy-4-methoxybenzophenone,
2,2'-dihydroxy-4-methoxybenzophenone,
2,2',4,4'-tetrahydroxybenzophenone,
2-hydroxy-4-methoxy-4'-chlorobenzophenone,
p-tert-butylphenyl salicylate,
2,2-dihydroxy-4,4'-dimethoxybenzophonone,
ethyl-2-cyano-3,3-diphenyl acrylate,
2-hydroxy-4-benzyloxybenzophenone,
2-(2'-hydroxy-3'-tert-butyl-5'-methyl phenyl)-5-chlorobenzotriazole,
2-(2'-hydroxy-3'-5'-di-tert-butyl phenyl)benzotriazole,
2-(2'-hydroxy-3',5'-di-tert-butyl phenyl)benzotriazole,
2-(2'-hydroxy-4'-tert-octoxy phenyl)benzotriazole,
p-octylphenyl salicylate,
2-hydroxy-4-n-octoxybenzophenone,
2,2'-dihydroxy-4-n-octoxybenzophenone,
2-(2'-hydroxy-4'-octoxy phenyl)benzophenone,
2-(2'-hydroxy-3'-tert-butyl-5'-hexylphenyl)benzotriazole,
2-(2'-hydroxy-3',5'-di-tert-butylphenyl)-5-chlorobenzotriazole,
2-ethyl-2'-ethoxy-5'-tert-butyl-N,N'-diphenyl oxamide,
2-hydroxy-4-dodecyloxybenzophenone,
2,4-di-tert-butyl phenyl-3,5-di-tert-butyl-4-hydroxybenzoate,
3,5-di-tert-butyl-4-hydroxy myristyl benzoate,
bis(2,2',6,6'-tetramethyl-4-piperidine)sebacate,
[2,2'-thio-bis(4-tert-octyl phenolate)]-tertbutylamino nickel (II),
nickel salt of bis(3,5-tert-butyl-4-hydroxy benzoyl phosphoric acid monoethyl ester),
nickel salt of bis(3,5-di-tert-butyl-4-hydroxy benzoyl phosphoric acid monooctyl ester),
nickel salt of 2,2'-thiobis(4,4'-alkylphenol).

Examples of the lubricants and slip agents include aliphatic hydrocarbons such as paraffin waxes, polyethylene waxes and polypropylene waxes; higher fatty acids such as capric acid, lauric acid, myristic acid, palmitic acid, margaric acid, stearic acid, arachidonic acid and behenic acid; metal salts of these fatty acids such as their lithium, calcium, sodium, magnesium and potassium salts; aliphatic alcohols such as palmityl alcohol, cetyl alcohol and stearyl alcohol; aliphatic amides such as caproic amide, caprylic amide, capric amide, lauric amide, myristic amide, plamitic amide, stearic amide and erucic amide; esters formed between fatty acids and alcohols; and fluorine compounds such as fluoroalkylcarboxylic acids and metal salts thereof and fluoroalkylsulfonic acids and metal salts thereof.

Examples of the antiblocking agents are silica, talc, clay and diatomaceous earth.

Examples of the antistatic agents include lauryl diethanol amine, dioxy ethylene lauryl amine, N,N-bis(2-hydroxyethyl)stearylamine, stearyl monoglyceride, sodium ditridecyl sulfosuccinate, sorbitan fatty acid esters, polyoxyethylene laurylamine, and stearyl diethanolamine monostearate.

Examples of the antihaze agents include glycerin acid esters, sorbitan acid esters, acylsarcosines, polyoxyethylene glycerin monostearate and diethanolamine.

Examples of the pigment and dyes include titanium dioxide, calcium carbonate, carbon black, lead suboxide, cadmium red, vermillion, red iron oxide, brown iron oxide, barium yellow, titanium yellow, viridian, ultramarine, cobalt blue, cobalt violet, azo pigments, nitroso lake pigments, nitro lake pigments, basic dye lakes, phthalocyanine pigments, organic fluorescent pigments, and pearl essence.

Examples of the inorganic or organic fillers are calcium carbonate, clay, talc, silica, diatomaceous earth, siliceous sand, mica powder, slate flour, alumina white, wood flour, hard rubber dust and cellulose powder.

Examples of the hydrochloric acid absorbers include calcium oxide, lithium stearate, sodium stearate, epoxidized octyl stearate, hydrotalcite, calcium stearate, zinc stearate and calcium-12-hydroxystearate.

Examples of the nucleating agents include organic carboxylic acids and metal salts thereof, benzylidene sorbitol and its derivatives.

The amounts of these additives may be properly chosen. For example, based on the weight of polypropylene, they are about 0.05 to about 0.5% by weight for the heat stabilizers, weatherability stabilizers, the agents and the hydrochloric acid absorbers; about 0.1 to about 2% by weight for the lubricants, antistatic agents, antihaze agents, dyes or pigments, and fillers; about 0.01 to about 0.5% by weight for the antiblocking agents; and about 0.05 to about 0.1% by weight for the nucleating agents.

The film-forming propylene copolymer of this invention has excellent stretchability and rigidity, and may be in the form of monoaxially or biaxially stretched shaped articles having excellent properties. For example, these shaped articles include tapes, bands, tied cords, flat yarns, packaging films, and stretched bottles. Or compositions having excellent impact strength and rigidity may be obtained by blending the copolymer of this invention with polyethylene or a low-crystalline or amorphous ethylene/alpha-olefin copolymer. These compositions may be shaped into industrial component parts, automotive parts and component parts of household electric appliances.

According to one preferred embodiment, the film-forming propylene copolymer is in the form of a biaxially stretched film obtained by stretching at a stretch ratio of at least 3.5, for example 3.5 to 7, in the longitudinal direction (machine direction) and at least 7, for example 7 to 12, in the transverse direction.

The biaxially stretched propylene copolymer film can be produced by melt-extruding through a T-die or a ring-like die a film-forming propylene copolymer composed of a major amount of propylene and a minor amount of ethylene and having (A) an ethylene content (Ec) of from 0.1 mole % to 2.0 mole % based on the total amount of propylene and ethylene, and (B) an isotactic value (Iso) in the range represented by the following formula (1) or (2), (i) when $0.1 \leq Ec \leq 0.3$, $$Iso \geq -5\underline{Ec} + 96.3 (\%) \qquad (1),$$

and (ii) when $0.3 < Ec \leq 2.0$, $$Iso \geq -0.67\underline{Ec} + 95.0 (\%) \qquad (2)$$

wherein $\underline{Ec}$ represents the numerical value of Ec (mole %);
cooling the extruded film to solidify it; and stretching the solidified film in the machine direction at a stretch ratio of 3.5 with the temperature of the atmosphere in which the film is stretched being kept at about 110° C. to about 150° C. and in the transverse direction at a stretch ratio of at least 7 with the temperature of the atmosphere in which the film is stretched being kept at about 155° C. to about 165° C.

The melt-extruding temperature is, for example, about 220° to about 300° C., preferably about 240° to about 280° C. The melt-extruded film is then cooled to solidify it. In the T-die method, cooling is carried out by using a chill roll having a surface temperature of, for example, about 10° to about 70° C. In the case of the tubular method, the cooling of the film may be carried out by using cooling air and cooling water kept at a temperature of, for example, about 0° to about 40° C.

The solidified film is stretched biaxially. Stretching may be started either longitudinally or transversely. For convenience of the operation, however, it is preferably stretched first in the longitudinal direction and then in the transverse direction. Prior to stretching, the solidified film may be pre-heated at a temperature of, for example, about 60° to about 110° C.

The biaxial stretching may be carried out at a temperature of about 110° to about 150° C., preferably about 120° to about 140° C., and at a stretch ratio of at least 3.5, preferably 3.5 to 7, more preferably 4.5 to 6, in the longitudinal direction; and at a temperature of about 155° to about 165° C., preferably about 160° to about 165° C., and at a stretch ratio of at least 7, preferably 7 to 12, more preferably 8 to 11, in the transverse direction.

During or after molding the OPP film as described above, one or both surfaces of the film may be subjected to a corona discharge treatment or to vacuum evaporation of metals such as aluminum.

The OPP film of this invention which has been stretched at a stretch ratio of, for example, 3.5 to 7 in the longitudinal direction, and a stretch ratio of, for example, 7 to 12, in the transverse direction has better transparency, rigidity and impact strength and a better balance of these properties than conventional OPP films. It is suitable as a packaging film, an insulating condenser film, etc. either as such or as a laminate film with a film of low-density polyethylene, medium-density polyethylene, a random copolymer of ethylene with propylene, 1-butene, 4-methyl-1-pentene, 1-hexene or 1-decene, a random copolymer of propylene with an alpha-olefin such as butene-1, 4-methyl-1-pentene, 1-hexene or 1-decene, an ethylene/vinyl alcohol copolymer or polyvinylidene chloride, or as a film extrusion-coated with a low-crystalline or amorphous ethylene/alpha-olefin random copolymer, a propylene/alpha-olefin random copolymer or a vinylidene chloride resin.

The following Examples illustrate the present invention more specifically. It should be understood that the scope of, the invention is in no way limited to these examples.

EXAMPLES 1 TO 3

Preparation of solid titanium catalyst component [A]:

Anhydrous magnesium chloride (47.6 g), 250 ml of decane and 234 ml of 2-ethylhexyl alcohol were reacted at 130° C. for 2 hours to form a uniform solution. Then, 11.1 g of phthalic anhydride was added to the solution, and they were mixed with stirring at 130° C. for 1 hour to dissolve phthalic anhydride in the uniform solution. The resulting uniform solution was cooled to room temperature, and entirely added dropwise over 1 hour to 2 liters of titanium tetrachloride kept at −20° C. After the addition, the mixed solution was heated to 110° C. over 4 hours. When its temperature reached 110° C., 26.8 ml of diisobutyl phthalate was added, and the mixture was maintained at this temperature for 2 hours with stirring. After the reaction, the reaction mixture was hot-filtered to collect the solid portion. The solid portion was again suspended in 2 liters of TiCl$_4$, and the suspension was heated at 110° C. for 2 hours. After the reaction, the solid portion was collected by hot filtration, and then washed thoroughly with decane and hexane at 110° C. until no free titanium compound was detected in the washings. As a result, a solid titanium catalyst component [A] was obtained.

Polymerization:

A 200 liter autoclave was charged with 75 liters of purified hexane, and then at room temperature in an atmosphere of propylene, with 251 mmoles of triethyl aluminum, 15 mmoles of diphenyldimethoxysilane and 1.5 mmoles, calculated as titanium atom, of the solid titanium catalyst component [A]. Hydrogen (7 liters) was introduced into the autoclave, and the contents of the autoclave were heated to 60° C. After the temperature of the polymerization system reached 60° C., a gaseous mixture of propylene and ethylene having each of the compositions shown in Table 1 was fed into the autoclave and maintained under a polymerization pressure of 2 kg/cm$^2$G. After the polymerization, the slurry containing the resulting polymer was filtered to give a white powdery copolymer. The basic properties of the white powdery copolymer are shown in Table 1.

A suitable antioxidant, HCl absorbing agent and antistatic agent were added to the copolymer was pelletized by an extruder. The pellets were melted in an extruder and extruded from a T-die at a resin temperature of 270° C. and cooled and solidified in sheet form. The sheet was then passed between hot rolls kept at 130° C. and 140° C. (driven at a rate of 4 m/min., and 20 m/min.) to stretch it longitudinally at a stretch ratio of 5. The sheet was then stretched transversely at a stretch ratio of 10 in a tenter whose temperature was kept at 190° C. near its inlet and 165° C. near its outlet. A film having a thickness of about 30 microns was obtained.

The film was tested for the following properties.

Haze (%): ASTM D1003.

Impact strength (kg-cm/cm): Measured by a film impact tester made by Toyo Seiki K.K. The spherical surface of the impact head had a diameter of 1 inch.

Young's modulus (kg/cm$^2$): Measured at a pulling speed of 200 mm/min. on a dumbbell specimen stipulated in JIS K-6781.

Heat shrinkage (%): The shrinkage of a test specimen was measured after it had been kept in an atmosphere at 140° C. for 15 minutes.

Surface inherent resistivity (ohms): Measured after a test specimen was kept in an atmosphere at 40° C. for 2 days.

The results are shown in Table 2.

COMPARATIVE EXAMPLE 1

A 200 liter autoclave was charged with 75 liters of purified hexane, and then at room temperature in an atmosphere of propylene, with 2.51 mmoles of triethyl aluminum, 15 mmoles of diphenylmethoxysilane and 1.5 mmoles, calculated as titanium atom, of the solid titanium catalyst component [A] described in Examples 1 to 3. Hydrogen (18 liters) was introduced into the autoclave, and the contents of the autoclave were heated to 70° C. Propylene was polymerized at this temperature for 2 hours. During the polymerization, the pressure of the polymerization system was maintained at 7 kg/cm$^2$.

After the polymerization, the slurry containing the resulting polymer was filtered to obtain a white powdery polymer. The basic properties of the white powdery polymer are shown in Table 1.

The polymer was melted in the same way as in Examples 1 to 3 except that the temperature of the tenter was changed to 200° C. near its inlet and 170° C. near its outlet since no good film could be obtained at the tenter temperatures specified in Examples 1 to 3.

The results are shown in Table 2.

COMPARATIVE EXAMPLES 2 AND 3

A 200 liter autoclave was charged with 75 liters of purified hexane, and then at room temperature in an atmosphere of propylene, with 600 mmoles of diethyl aluminum monochloride and then 200 mmoles, calculated as titanium atom, of titanium trichloride (TAC-131, a tradename for a product of Toho Titanium Co., Ltd.). Hydrogen (10 liters) was introduced into the autoclave, and the contents of the autoclave were heated to 55° C. When the temperature of the polymerization system reached 55° C., a gaseous mixture of propylene and ethylene having the composition shown in Table 1 was fed into the autoclave and maintained under a polymerization pressure of 2 kg/cm° G for 10 hours. After the polymerization, the slurry containing the resulting copolymer was filtered to obtain a white powdery copolymer. The basic properties of the copolymer are shown in Table 1.

The copolymer was molded in the same way as in Examples 1 to 3 except that in Comparative Example 3, the temperature of the tenter was changed to 180° C. near its inlet and 160° C. near its outlet.

The results are shown in Table 2.

COMPARATIVE EXAMPLE 4

A 200 liter autoclave was charged with 75 liters of purified hexane, and then at room temperature in an atmosphere of propylene, with 300 mmoles of diethyl aluminum monochloride and then 100 mmoles, calculated as titanium atom, of titanium trichloride (TAC-131, Toho Titanium Co., Ltd.). Hydrogen (52 liters) was introduced into the autoclave, and the temperature was raised to 60° C. Propylene was introduced into the autoclave and maintained under a polymerization pressure of 7 kg/cm$^2$G for 8 hours. After the polymerization, the slurry containing the resulting polymer was filtered to give a white powdery polymer having the basic properties shown in Table 1.

The polymer was molded in the same way as in Examples 1 to 3.

The results are shown in Table 2.

COMPARATIVE EXAMPLE 5

Example 1 was repeated except that the content of ethylene in the gaseous mixture of propylene and ethylene fed at the time of polymerization was changed to 3.5 mole %. The results are shown in Table 1.

The resulting copolymer was molded in the same way as in Comparative Example 3.

The results are shown in Table 2.

TABLE 1

| | Composition of the feed gas (mole %) | | Basic properties of the white powdery polymer | | |
|---|---|---|---|---|---|
| | Propylene | Ethylene | Ethylene content (mole %) | [η] (dl/g) | Iso (%) |
| Example 1 | 99.6 | 0.4 | 0.3 | 2.82 | 96.6 |
| Example 2 | 99.2 | 0.8 | 0.5 | 2.84 | 96.4 |
| Example 3 | 98.6 | 1.4 | 0.9 | 2.80 | 95.8 |
| Comparative Example 1 | 100 | 0 | 0 | 2.75 | 97.7 |
| Comparative Example 2 | 99.6 | 0.4 | 0.3 | 2.80 | 94.6 |
| Comparative Example 3 | 99.2 | 0.8 | 0.7 | 2.74 | 94.1 |
| Comparative Example 4 | 100 | 0 | 0 | 2.74 | 95.7 |
| Comparative Example 5 | 96.5 | 3.5 | 2.6 | 2.78 | 93.8 |

TABLE 2

|  | Haze (%) | Impact strength (kg cm/cm) | Tensile Young's modulus (machine/transverse × $10^4$ kg/cm$^2$) | Heat shrinkage (machine/transverse, %) | Surface inherent resistivity (Ω) | Stretch ability (*) |
| --- | --- | --- | --- | --- | --- | --- |
| Example 1 | 1.5 | 3200 | 3.0/6.2 | 4.0/4.6 | $1.8 \times 10^{12}$ | A |
| Example 2 | 1.5 | 3400 | 2.9/6.3 | 5.0/6.1 | $1.4 \times 10^{12}$ | A |
| Example 3 | 1.3 | 3800 | 2.7/5.9 | 5.7/6.4 | $9.5 \times 10^{11}$ | A |
| Comparative Example 1 | 2.5 | 3100 | 3.5/6.5 | 3.9/5.7 | $7.7 \times 10^{14}$ | C |
| Comparative Example 2 | 1.8 | 2900 | 2.6/5.5 | 6.8/7.2 | $8.0 \times 10^{11}$ | A |
| Comparative Example 3 | 1.6 | 3100 | 2.5/5.3 | 7.2/7.5 | $7.8 \times 10^{11}$ | B |
| Comparative Example 4 | 3.0 | 2800 | 2.7/5.8 | 6.2/6.8 | $8.3 \times 10^{11}$ | A |
| Comparative Example 5 | 1.0 | 4500 | 2.3/4.9 | 7.5/7.7 | $7.8 \times 10^{11}$ | B |

(*)Evaluated when the tenter temperature was prescribed at 190–165° C. A, B and C the following meanings.
A: Film formation could be carried out without a problem, and a good film was formed.
B: A film was obtained, but lacked transparency.
C: The film was broken during film formation.

What is claimed is:

1. A film-forming propylene copolymer composed of a major amount of propylene and a minor amount of ethylene, characterized by having
   (A) an ethylene content (Ec) of from 0.1 mole % to 2.0 mole % based on the total amount of propylene and ethylene, and
   (B) an isotactic value (Iso) in the range represented by the following formula (1) or (2),
   (i) when $0.1 \leq Ec \leq 0.3$, $$Iso \geq -5\underline{Ec} + 96.8 (\%) \quad (1),$$

and
   (ii) when $0.3 < Ec \leq 2.0$, $$Iso \geq -0.67\underline{Ec} + 95.5 (\%) \quad (2)$$

wherein $\underline{Ec}$ represents the numerical value of Ec (mole %).

2. The copolymer of claim 1 which is further characterized by having
   (C) an intrinsic viscosity [η], determined in decalin at 135° C., of from 1.2 to 6.0 dl/g.

3. The copolymer of claim 1 which is in the form of a biaxially stretched film with a stretch ratio of at least 3.5 in the longitudinal direction and at least 7 in the transverse direction.

4. The copolymer of claim 1 wherein the ethylene content (Ec) is from 0.1 to 1.5 mole %, based on the total amount of propylene and ethylene.

5. The copolymer of claim 1 wherein the ethylene content (Ec) is from 0.3 to 1.5 mole %, based on the total amount of propylene and ethylene.

6. The copolymer of claim 2 wherein the ethylene content (Ec) is from 0.3 to 1.5 mole %, based on the total amount of propylene and ethylene.

7. The copolymer of claim 6 wherein the intrinsic viscosity is from 1.5 to 5.0 dl/g.

8. The copolymer of claim 2 wherein the intrinsic viscosity is from 1.5 to 5.0 dl/g.

9. The copolymer of claim 3 wherein the stretch ratio in the longitudinal direction is from 3.5 to 7 and in the transverse direction is from 7 to 12.

10. The copolymer of claim 3 wherein the biaxially stretched film has a haze in the range of from about 1.3 to about 1.5%, an impact strength in the range of from about 3200 to 3400 kg/cm/cm, a tensile Young's modulus in the machine direction of from 2.7 to $3.0 \times 10^4$ kg/cm$^2$, and a tensile Young's modulus in the transverse direction in the range of from 5.9 to $6.3 \times 10^4$ kg/cm$^2$.

* * * * *